United States Patent
Lee et al.

(10) Patent No.: US 10,148,222 B2
(45) Date of Patent: Dec. 4, 2018

(54) INVERTER APPARATUS AND SOLAR ENERGY GRID-CONNECTED POWER GENERATION SYSTEM

(71) Applicant: DELTA ELECTRONICS, INC., Taoyuan County (TW)

(72) Inventors: Lei-Ming Lee, Taoyuan County (TW); Chen-Wei Ku, Taoyuan County (TW); Xin-Hung Lin, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 133 days.

(21) Appl. No.: 15/099,893

(22) Filed: Apr. 15, 2016

(65) Prior Publication Data
US 2017/0093332 A1   Mar. 30, 2017

(30) Foreign Application Priority Data

Sep. 24, 2015  (TW) ............... 104131555 A

(51) Int. Cl.
*H02S 40/32* (2014.01)
*H02M 7/537* (2006.01)
(Continued)

(52) U.S. Cl.
CPC .............. *H02S 40/32* (2014.12); *H02J 3/383* (2013.01); *H02M 7/48* (2013.01); *H02M 7/537* (2013.01);
(Continued)

(58) Field of Classification Search
CPC ........ H02J 1/00; H02J 1/14; H02J 3/00; H02J 3/14; H02J 3/383; H02M 2001/00;
(Continued)

(56) References Cited

U.S. PATENT DOCUMENTS

| 9,306,472 | B2 | 4/2016 | Shimada et al. |
| 9,413,270 | B2 | 8/2016 | Liu et al. |
| 2009/0303762 | A1* | 12/2009 | Jang ............ H02M 1/4208 363/61 |
| 2012/0139343 | A1* | 6/2012 | Adest ............. G01S 3/7861 307/43 |

(Continued)

FOREIGN PATENT DOCUMENTS

| JP | 2006-280106 | 10/2006 |
| JP | 2015-027178 | 2/2015 |

(Continued)

OTHER PUBLICATIONS

Office Action dated Mar. 2, 2017 from corresponding application No. JP 2016-084585.
Office Action dated Apr. 20, 2016 from corresponding application No. TW 104131555.

*Primary Examiner* — Lincoln Donovan
*Assistant Examiner* — David Mattison
(74) *Attorney, Agent, or Firm* — Hauptman Ham, LLP

(57) ABSTRACT

An inverter apparatus includes a first capacitor, a second capacitor, a first switch, a second switch, a third switch, a fourth switch, a first inductor and a second inductor. The first capacitor, the second capacitor, the first switch, the third switch and the first inductor form and have functions of a half bridge inverter. The first capacitor, the second capacitor, the second switch, the fourth switch and the second inductor form and have functions of a half bridge inverter. Therefore, the present invention obtains two kinds of voltages.

10 Claims, 6 Drawing Sheets

(51) Int. Cl.
*H02M 7/48* (2007.01)
*H02J 3/38* (2006.01)
*H02M 1/00* (2006.01)

(52) U.S. Cl.
CPC ...... *H02M 2001/009* (2013.01); *Y02E 10/563* (2013.01)

(58) Field of Classification Search
CPC ............ H02M 2001/009; H02M 3/00; H02M 3/33561; H02M 7/00; H02M 7/48; H02M 7/537; H02S 40/00; H02S 40/32; Y02B 70/00; Y02B 70/3225; Y02E 10/00; Y02E 10/563
USPC .......................................................... 307/31
See application file for complete search history.

(56) References Cited

U.S. PATENT DOCUMENTS

2015/0029772 A1* 1/2015 Shimada ................. H02M 7/48
363/132
2015/0207433 A1 7/2015 Liu et al.

FOREIGN PATENT DOCUMENTS

TW 201531010 8/2015
WO WO2013/080878 6/2013

\* cited by examiner

INVERTER APPARATUS AND SOLAR ENERGY GRID-CONNECTED POWER GENERATION SYSTEM

BACKGROUND OF THE INVENTION

Field of the Invention

The present invention relates to an inverter apparatus and a solar energy grid-connected power generation system, and especially relates to an inverter apparatus obtaining two kinds of voltages and a solar energy grid-connected power generation system obtaining two kinds of voltages.

Description of the Related Art

FIG. 1 shows a block diagram of an embodiment of the related art solar energy grid-connected power generation system. A related art solar energy grid-connected power generation system 50 is applied to a first power grid L1 and a second power grid L2. The related art solar energy grid-connected power generation system 50 comprises a solar panel apparatus 40, a direct current to direct current converter 20, a first output point P3, a second output point P4, a first capacitor C1, a second capacitor C2, a first switch Q1, a second switch Q2, a third switch Q3, a fourth switch Q4, a first inductor 108, a second inductor 110, a third capacitor C3, a fourth capacitor C4, a first relay switch R1 and a second relay switch R2.

The operation of the first switch Q1, the second switch Q2, the third switch Q3 and the fourth switch Q4 is a full bridge inverter. The first switch Q1 and the fourth switch Q4 turns on or turns off together. The second switch Q2 and the third switch Q3 turns on or turns off together. The disadvantage of the related art solar energy grid-connected power generation system 50 is that the related art solar energy grid-connected power generation system 50 can output only one kind of voltage. Therefore, if a country has two kinds of voltages, the related art solar energy grid-connected power generation system 50 can output only one kind of voltage.

Taking Japan for example, Japan has two kinds of voltages, 101 volts and 202 volts. If the related art solar energy grid-connected power generation system 50 is used in Japan, in the grid-connected status or the stand alone mode, the related art solar energy grid-connected power generation system 50 can output only one kind of voltage. As shown in FIG. 1, if the first power grid L1 is 101 volts and the second power grid L2 is 101 volts, the voltage difference between the first output point P3 and the second output point P4 is 202 volts. If the voltage requirement of a household appliance connected to the first output point P3 and the second output point P4 is 101 volts, an extra transformer has to be arranged, or the household appliance requiring 101 volts cannot be used.

SUMMARY OF THE INVENTION

In order to solve the above-mentioned problems, an object of the present invention is to provide an inverter apparatus.

In order to solve the above-mentioned problems, another object of the present invention is to provide a solar energy grid-connected power generation system.

In order to solve the above-mentioned problems, still another object of the present invention is to provide an inverter apparatus.

In order to achieve the object of the present invention mentioned above, the inverter apparatus is applied to a direct current to direct current converter, a first power grid and a second power grid. The inverter apparatus comprises a first output point, a second output point and a third output point. The first output point is connected to one side of the first power grid. The second output point is connected to one side of the second power grid. The third output point is connected between the other side of the first power grid and the other side of the second power grid. A voltage difference between the first output point and the third output point is equal to a voltage provided by the first power grid. A voltage difference between the third output point and the second output point is equal to a voltage provided by the second power grid. A voltage difference between the first output point and the second output point is equal to the voltage provided by the first power grid added by the voltage provided by the second power grid.

Moreover, the inverter apparatus further comprises a first relay switch, a second relay switch and a third relay switch. The first relay switch is connected to the first output point and one side of the first power grid. The second relay switch is connected to the second output point and one side of the second power grid. The third relay switch is connected to the third output point, the other side of the first power grid and the other side of the second power grid.

Moreover, the inverter apparatus further comprises a first point, a second point, a first capacitor, a second capacitor, a first switch, a second switch, a third switch, a fourth switch, a first inductor and a second inductor. The first point is connected to the direct current to direct current converter. The second point is connected to the direct current to direct current converter. The first capacitor is connected between the first point and the third output point. The second capacitor is connected between the second point and the third output point. A first side of the first switch is connected to the first point. A first side of the second switch is connected to the first point. A first side of the third switch is connected to a second side of the first switch. A second side of the third switch is connected to the second point. A first side of the fourth switch is connected to a second side of the second switch. A second side of the fourth switch is connected to the second point. One side of the first inductor is connected to the second side of the first switch and the first side of the third switch. The other side of the first inductor is connected to the first output point. One side of the second inductor is connected to the second side of the second switch and the first side of the fourth switch. The other side of the second inductor is connected to the second output point. The first capacitor, the second capacitor, the first switch, the third switch and the first inductor form a half bridge inverter to output a first voltage. The first capacitor, the second capacitor, the second switch, the fourth switch and the second inductor form a half bridge inverter to output a second voltage.

Moreover, the inverter apparatus further comprises a switch controller, a third capacitor and a fourth capacitor. The switch controller turns on or turns off the first switch, the second switch, the third switch and the fourth switch. The third capacitor is connected between the first output point and the third output point. The fourth capacitor is connected between the third output point and the second output point. The switch controller turns on or turns off the first switch, the second switch, the third switch and the fourth switch, so that the first capacitor, the second capacitor, the first switch, the third switch and the first inductor form a half bridge inverter to output the first voltage. The first capacitor, the second capacitor, the second switch, the fourth switch and the second inductor form a half bridge inverter to output the second voltage.

Moreover, the inverter apparatus further comprises a relay switch controller connected to the first relay switch, the second relay switch and the third relay switch. When the relay switch controller turns on the first relay switch, the second relay switch and the third relay switch, the first capacitor, the second capacitor, the first switch, the third switch and the first inductor form a half bridge inverter to output the first voltage, and the first capacitor, the second capacitor, the second switch, the fourth switch and the second inductor form a half bridge inverter to output the second voltage. When the relay switch controller turns on the first relay switch and the second relay switch but turns off the third relay switch, the first capacitor, the second capacitor, the first switch, the second switch, the third switch, the fourth switch, the first inductor and the second inductor form a full bridge inverter to output a third voltage.

Moreover, the inverter apparatus further comprises a load switch unit electrically connected to the first output point, the second output point and the third output point, and used to turn on or turn off an external load.

In order to achieve the object of the present invention mentioned above, the solar energy grid-connected power generation system is applied to a first power grid and a second power grid. The solar energy grid-connected power generation system comprises a solar panel apparatus, a direct current to direct current converter, a first output point, a second output point and a third output point. The direct current to direct current converter is electrically connected to the solar panel apparatus. The first output point is connected to one side of the first power grid. The second output point is connected to one side of the second power grid. The third output point is connected between the other side of the first power grid and the other side of the second power grid. A voltage difference between the first output point and the third output point is equal to a voltage provided by the first power grid. A voltage difference between the third output point and the second output point is equal to a voltage provided by the second power grid. A voltage difference between the first output point and the second output point is equal to the voltage provided by the first power grid added by the voltage provided by the second power grid.

Moreover, the solar energy grid-connected power generation system further comprises a first relay switch, a second relay switch and a third relay switch. The first relay switch is connected to the first output point and one side of the first power grid. The second relay switch is connected to the second output point and one side of the second power grid. The third relay switch is connected to the third output point, the other side of the first power grid and the other side of the second power grid.

Moreover, the solar energy grid-connected power generation system further comprises a first point, a second point, a first capacitor, a second capacitor, a first switch, a second switch, a third switch, a fourth switch, a first inductor and a second inductor. The first point is connected to the direct current to direct current converter. The second point is connected to the direct current to direct current converter. The first capacitor is connected between the first point and the third output point. The second capacitor is connected between the second point and the third output point. A first side of the first switch is connected to the first point. A first side of the second switch is connected to the first point. A first side of the third switch is connected to a second side of the first switch. A second side of the third switch is connected to the second point. A first side of the fourth switch is connected to a second side of the second switch. A second side of the fourth switch is connected to the second point. One side of the first inductor is connected to the second side of the first switch and the first side of the third switch. The other side of the first inductor is connected to the first output point. One side of the second inductor is connected to the second side of the second switch and the first side of the fourth switch. The other side of the second inductor is connected to the second output point. The first capacitor, the second capacitor, the first switch, the third switch and the first inductor form a half bridge inverter to output a first voltage. The first capacitor, the second capacitor, the second switch, the fourth switch and the second inductor form a half bridge inverter to output a second voltage.

Moreover, the solar energy grid-connected power generation system further comprises a switch controller, a third capacitor and a fourth capacitor. The switch controller turns on or turns off the first switch, the second switch, the third switch and the fourth switch. The third capacitor is connected between the first output point and the third output point. The fourth capacitor is connected between the third output point and the second output point. The switch controller turns on or turns off the first switch, the second switch, the third switch and the fourth switch, so that the first capacitor, the second capacitor, the first switch, the third switch and the first inductor form a half bridge inverter to output the first voltage. The first capacitor, the second capacitor, the second switch, the fourth switch and the second inductor form a half bridge inverter to output the second voltage.

Moreover, the solar energy grid-connected power generation system further comprises a relay switch controller connected to the first relay switch, the second relay switch and the third relay switch. When the relay switch controller turns on the first relay switch, the second relay switch and the third relay switch, the first capacitor, the second capacitor, the first switch, the third switch and the first inductor form a half bridge inverter to output the first voltage, and the first capacitor, the second capacitor, the second switch, the fourth switch and the second inductor form a half bridge inverter to output the second voltage. When the relay switch controller turns on the first relay switch and the second relay switch but turns off the third relay switch, the first capacitor, the second capacitor, the first switch, the second switch, the third switch, the fourth switch, the first inductor and the second inductor form a full bridge inverter to output a third voltage.

In order to achieve the object of the present invention mentioned above, the inverter apparatus is applied to a direct current to direct current converter and a power grid. The inverter apparatus comprises a first relay switch, a second relay switch, a third relay switch, a first output point, a second output point and a third output point. The first relay switch is connected to one side of the power grid. The second relay switch is connected to the other side of the power grid. The third relay switch is connected to the other side of the power grid and the second relay switch. The first output point is connected to the first relay switch. The second output point is connected to the second relay switch. The third output point is connected to the third relay switch. The first relay switch and the second relay switch are turned on. The third relay switch is turned off. A voltage difference between the first output point and the third output point is equal to a voltage provided by the power grid.

Moreover, the inverter apparatus further comprises a first point, a second point, a first capacitor, a second capacitor, a first switch, a second switch, a third switch, a fourth switch, a first inductor and a second inductor. The first point is connected to the direct current to direct current converter. The second point is connected to the direct current to direct current converter. The first capacitor is connected between the first point and the third output point. The second capacitor is connected between the second point and the third output point. A first side of the first switch is connected to the first point. A first side of the second switch is connected to the first point. A first side of the third switch is connected to a second side of the first switch. A second side of the third switch is connected to the second point. A first side of the fourth switch is connected to a second side of the second switch. A second side of the fourth switch is connected to the second point. One side of the first inductor is connected to the second side of the first switch and the first side of the third switch. The other side of the first inductor is connected to the first output point. One side of the second inductor is connected to the second side of the second switch and the first side of the fourth switch. The other side of the second inductor is connected to the second output point.

Moreover, the inverter apparatus further comprises a switch controller, a third capacitor and a fourth capacitor. The switch controller turns on or turns off the first switch, the second switch, the third switch and the fourth switch. The third capacitor is connected between the first output point and the third output point. The fourth capacitor is connected between the third output point and the second output point.

Moreover, the inverter apparatus further comprises a relay switch controller connected to the first relay switch, the second relay switch and the third relay switch.

The advantage of the present invention is to obtain two kinds of voltages. Moreover, the present invention can be converted from two half bridge inverters into a full bridge inverter to be applied to a single power grid.

DETAILED DESCRIPTION OF THE INVENTION

Please refer to following detailed description and figures for the technical content of the present invention. The following detailed description and figures are referred for the present invention, but the present invention is not limited to it.

Figure 1:
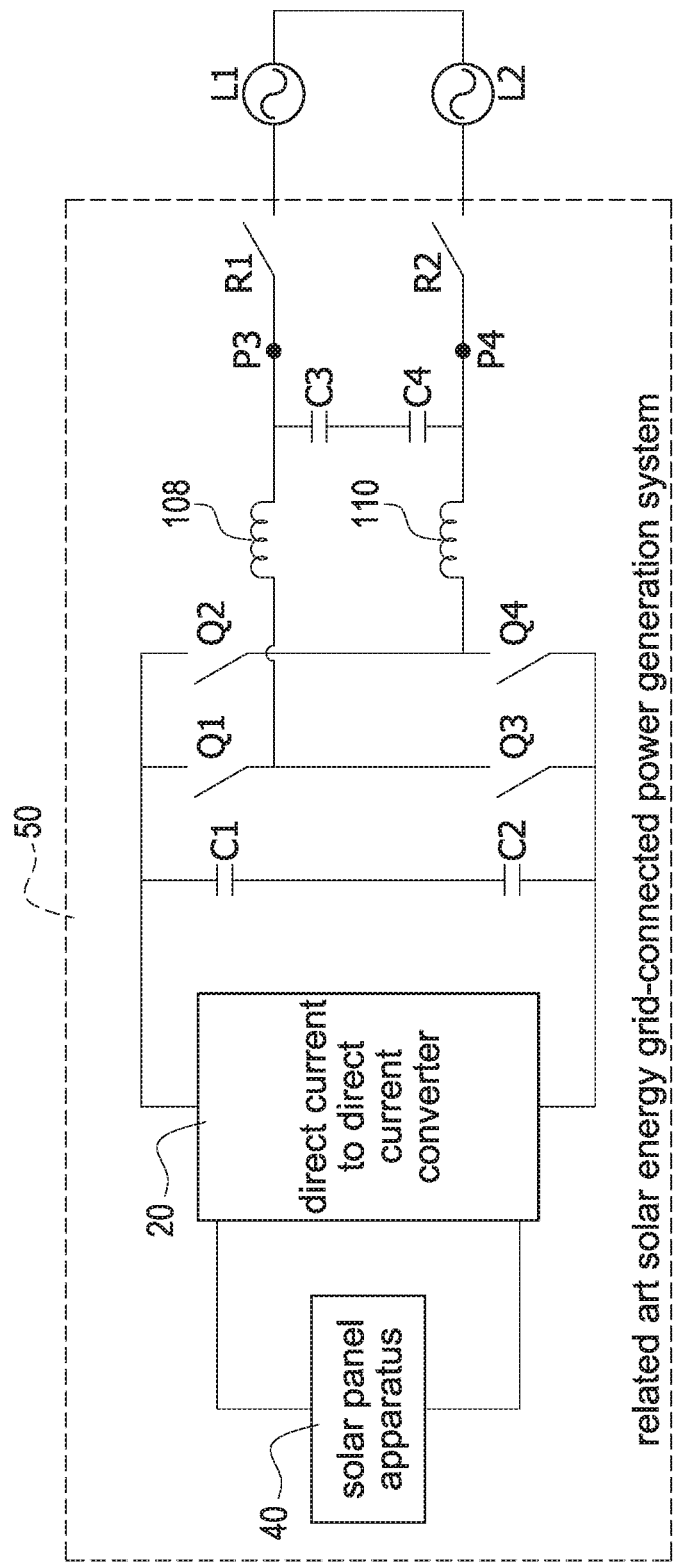
FIG. 1 shows a block diagram of an embodiment of the related art solar energy grid-connected power generation system.
Figure 2:
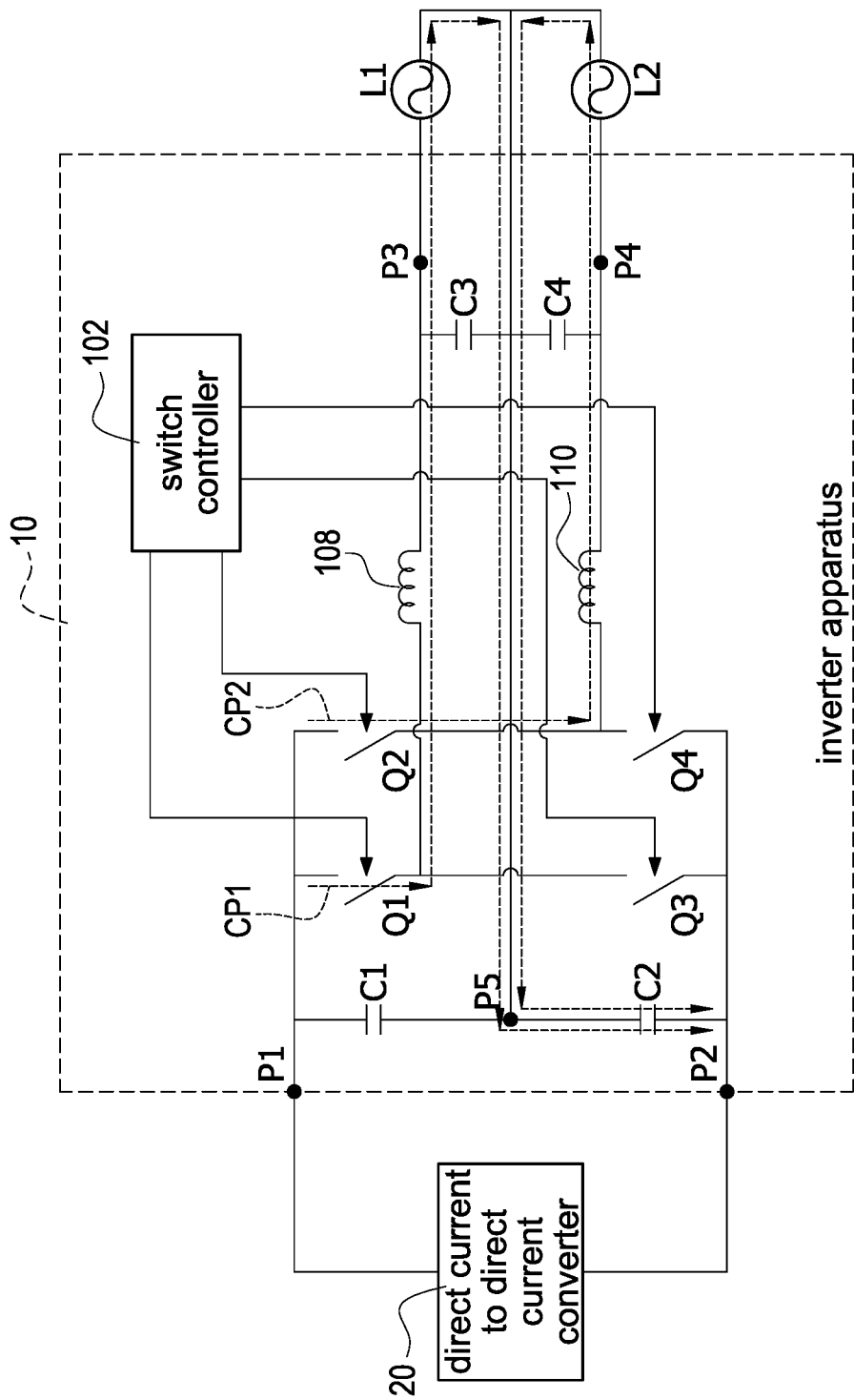
FIG. 2 shows a block diagram of the first embodiment of the inverter apparatus of the present invention.

FIG. 2 shows a block diagram of the first embodiment of the inverter apparatus of the present invention. An inverter apparatus 10 is applied to a direct current to direct current converter 20, a first power grid L1 and a second power grid L2. The inverter apparatus 10 comprises a first point P1, a second point P2, a first output point P3, a second output point P4, a third output point P5, a first capacitor C1, a second capacitor C2, a first switch Q1, a second switch Q2, a third switch Q3, a fourth switch Q4, a first inductor 108, a second inductor 110, a switch controller 102, a third capacitor C3 and a fourth capacitor C4. The first point P1 is connected to the direct current to direct current converter 20. The second point P2 is connected to the direct current to direct current converter 20. The first output point P3 is connected to one side of the first power grid L1. The second output point P4 is connected to one side of the second power grid L2. The third output point P5 is connected between the other side of the first power grid L1 and the other side of the second power grid L2. The first capacitor C1 is connected between the first point P1 and the third output point P5. The second capacitor C2 is connected between the second point P2 and the third output point P5. A first side of the first switch Q1 is connected to the first point P1. A first side of the second switch Q2 is connected to the first point P1. A first side of the third switch Q3 is connected to a second side of the first switch Q1. A second side of the third switch Q3 is connected to the second point P2. A first side of the fourth switch Q4 is connected to a second side of the second switch Q2. A second side of the fourth switch Q4 is connected to the second point P2. One side of the first inductor 108 is connected to the second side of the first switch Q1 and the first side of the third switch Q3. The other side of the first inductor 108 is connected to the first output point P3. One side of the second inductor 110 is connected to the second side of the second switch Q2 and the first side of the fourth switch Q4. The other side of the second inductor 110 is connected to the second output point P4. The switch controller 102 is connected to a third side of the first switch Q1, a third side of the second switch Q2, a third side of the third switch Q3 and a third side of the fourth switch Q4. The third capacitor C3 is connected between the first output point P3 and the third output point P5. The fourth capacitor C4 is connected between the third output point P5 and the second output point P4.

The first capacitor C1, the second capacitor C2, the first switch Q1, the third switch Q3 and the first inductor 108 form and have functions of a half bridge inverter to output a first voltage. The first capacitor C1, the second capacitor C2, the second switch Q2, the fourth switch Q4 and the second inductor 110 form and have functions of a half bridge inverter to output a second voltage. Therefore, a voltage difference between the first output point P3 and the second output point P4 is equal to a voltage provided by the first power grid L1 added by a voltage provided by the second power grid L2. A voltage difference between the first output point P3 and the third output point P5 is equal to the voltage provided by the first power grid L1. A voltage difference between the third output point P5 and the second output point P4 is equal to the voltage provided by the second power grid L2.

Moreover, the switch controller 102 turns on or turns off the first switch Q1, the second switch Q2, the third switch Q3 and the fourth switch Q4, so that the first capacitor C1, the second capacitor C2, the first switch Q1, the third switch Q3 and the first inductor 108 form and have functions of a half bridge inverter to output the first voltage. The first capacitor C1, the second capacitor C2, the second switch Q2, the fourth switch Q4 and the second inductor 110 form and have functions of a half bridge inverter to output the second voltage.

In another word, the present invention converts the original full bridge system (full bridge inverter) into two half bridge systems (two half bridge inverters), wherein the first switch Q1 and the third switch Q3 are complementary to control the first power grid L1 (a first control path CP1 is shown in FIG. 2), and the second switch Q2 and the fourth switch Q4 are complementary to control the second power grid L2 (a second control path CP2 is shown in FIG. 2), so that the flexibility of the inverter is increased.

Taking Japan for example, Japan has two kinds of power grids, 101 volts and 202 volts. The first power grid L1 is 101 volts. The second power grid L2 is 101 volts. In the grid-connected mode, if the voltage requirement of a household appliance is 101 volts, the household appliance can be connected between the first output point P3 and the third output point P5, or between the third output point P5 and the second output point P4. If the voltage requirement of the household appliance is 202 volts, the household appliance can be connected between the first output point P3 and the second output point P4. Therefore, no extra transformer is required.

Figure 3:
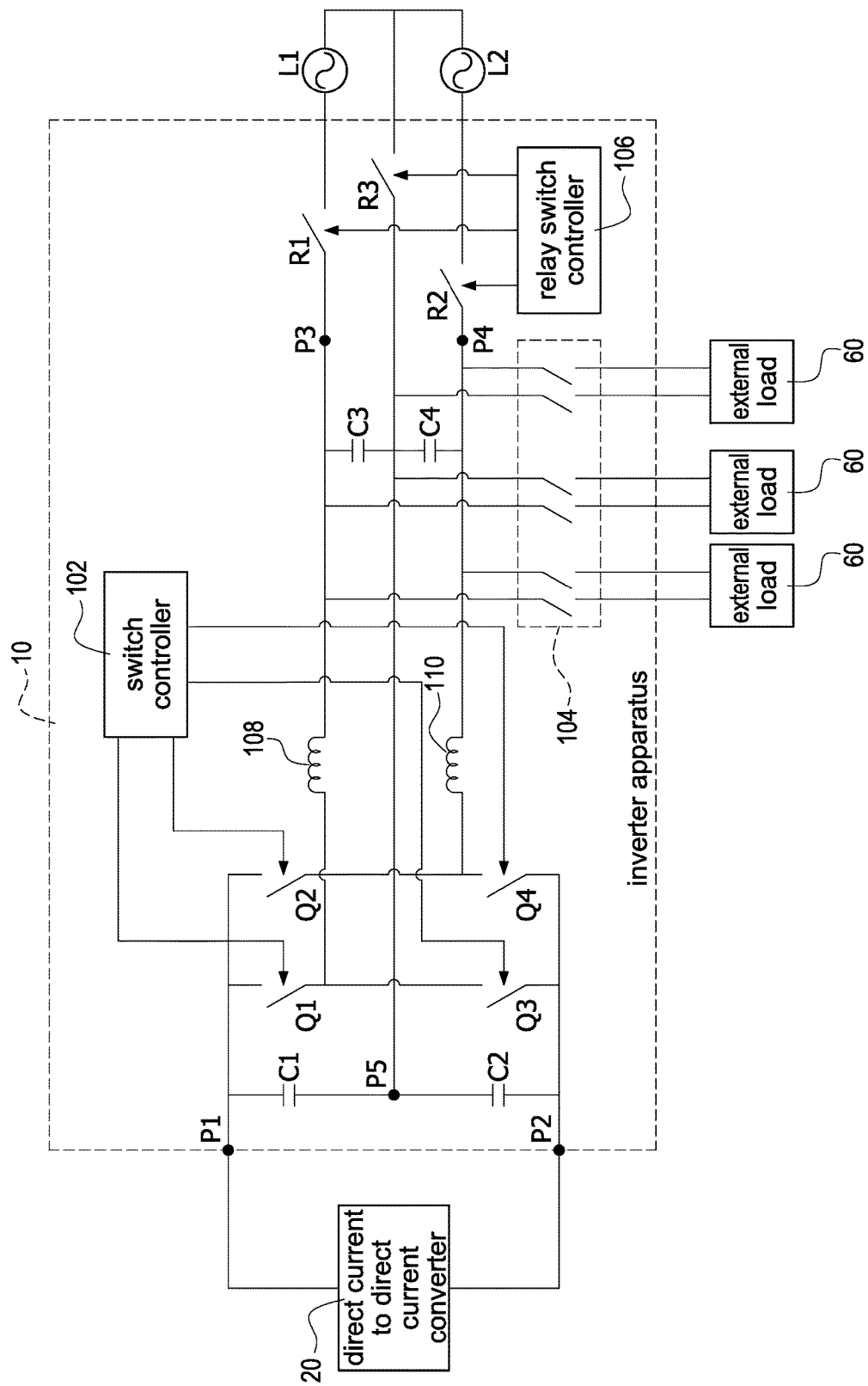
FIG. 3 shows a block diagram of the second embodiment of the inverter apparatus of the present invention.

FIG. 3 shows a block diagram of the second embodiment of the inverter apparatus of the present invention. The description for the elements shown in FIG. 3, which are similar to those shown in FIG. 2, is not repeated here for brevity. Moreover, the inverter apparatus 10 further comprises a first relay switch R1, a second relay switch R2, a third relay switch R3 and a relay switch controller 106. The first relay switch R1 is connected to the first output point P3 and one side of the first power grid L1. The second relay switch R2 is connected to the second output point P4 and one side of the second power grid L2. The third relay switch R3 is connected to the third output point P5, the other side of the first power grid L1 and the other side of the second power grid L2. The relay switch controller 106 is connected to the first relay switch R1, the second relay switch R2 and the third relay switch R3. Moreover, the inverter apparatus 10 further comprises a load switch unit 104 which comprises a plurality of switches and is electrically connected to the first output point P3, the second output point P4 and the third output point P5. The load switch unit 104 turns on or turns off the external load 60.

Generally speaking, when the inverter is ready to be connected to the power grid, first the relay switches are turned off. After everything is ready (namely, the voltages and currents of the inverter and the power grid conform to the regulations of the grid connected), the relay switches are just turned on, so that the inverter and the power grid are protected. The relay switches are turned off if operating in the stand alone mode. In the independent mode, if the voltage requirement of the household appliance is 101 volts, the household appliance can be connected between the first output point P3 and the third output point P5, or between the third output point P5 and the second output point P4. If the voltage requirement of the household appliance is 202 volts, the household appliance can be connected between the first output point P3 and the second output point P4.

When the relay switch controller 106 turns on the first relay switch R1, the second relay switch R2 and the third relay switch R3, the first capacitor C1, the second capacitor C2, the first switch Q1, the third switch Q3 and the first inductor 108 form and have functions of a half bridge inverter to output the first voltage, and the first capacitor C1, the second capacitor C2, the second switch Q2, the fourth switch Q4 and the second inductor 110 form and have functions of a half bridge inverter to output the second voltage. When the relay switch controller 106 turns on the first relay switch R1 and the second relay switch R2 but turns off the third relay switch R3, the first capacitor C1, the second capacitor C2, the first switch Q1, the second switch Q2, the third switch Q3, the fourth switch Q4, the first inductor 108 and the second inductor 110 form and have functions of a full bridge inverter to output a third voltage.

In another word, the third relay switch R3 is a mode switch. When the third relay switch R3 is turned on, the present invention have functions of two half bridge inverters to provide two kinds of voltages. When the third relay switch R3 is turned off, the present invention have functions of a full bridge inverter to provide only one kind of voltage, which is suitable for the single power grid. Therefore, the application of the present invention is wider.

Figure 4:
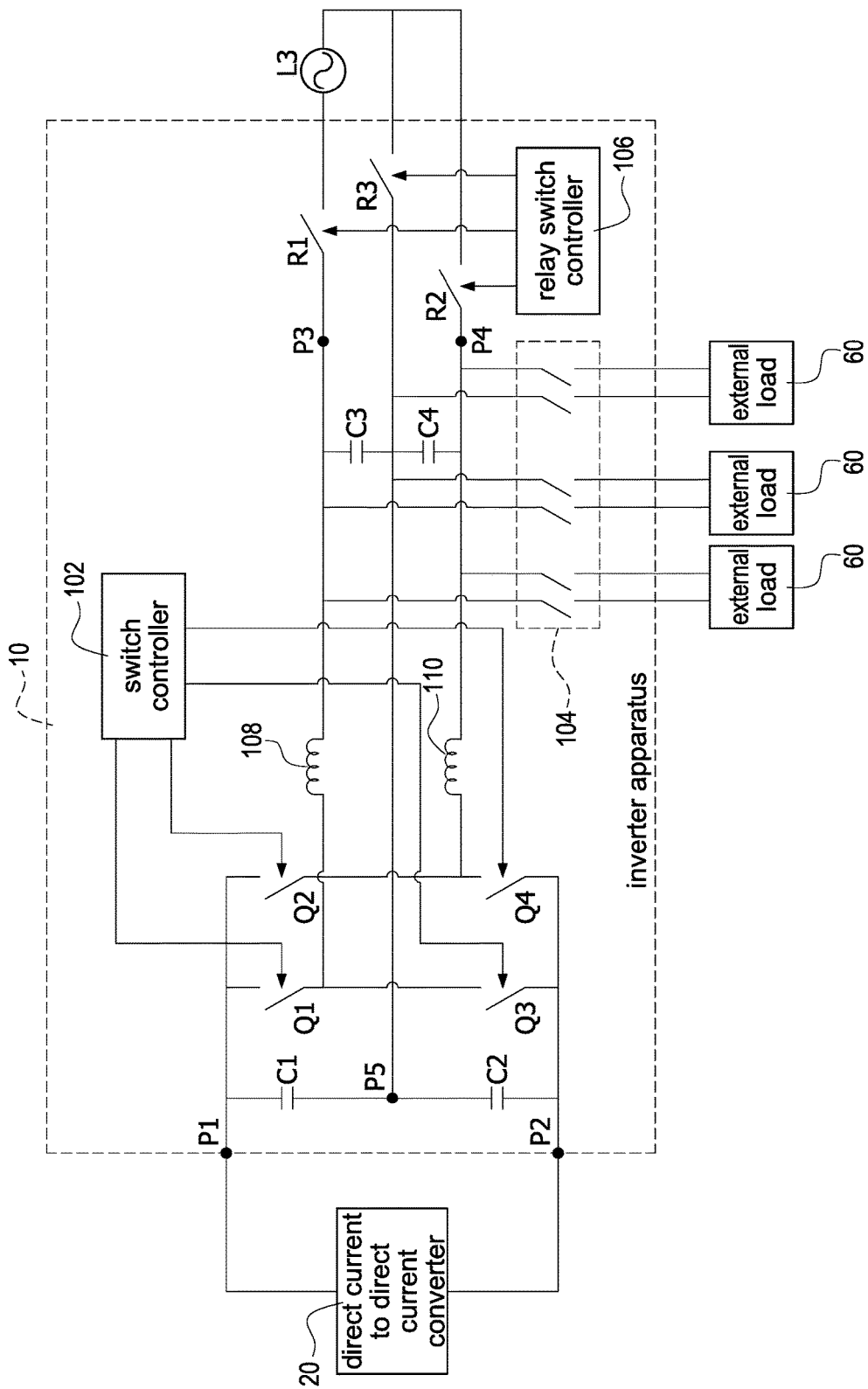
FIG. 4 shows a block diagram of the third embodiment of the inverter apparatus of the present invention.

For example, FIG. 4 shows a block diagram of the third embodiment of the inverter apparatus of the present invention. The description for the elements shown in FIG. 4, which are similar to those shown in FIG. 3, is not repeated here for brevity. Moreover, when being applied to the single power grid (namely, a third power grid L3), the first relay switch R1 and the second relay switch R2 are still turned on but the third relay switch R3 is turned off. The third power grid L3 is, for example but not limited to, 230 volts.

Figure 5:
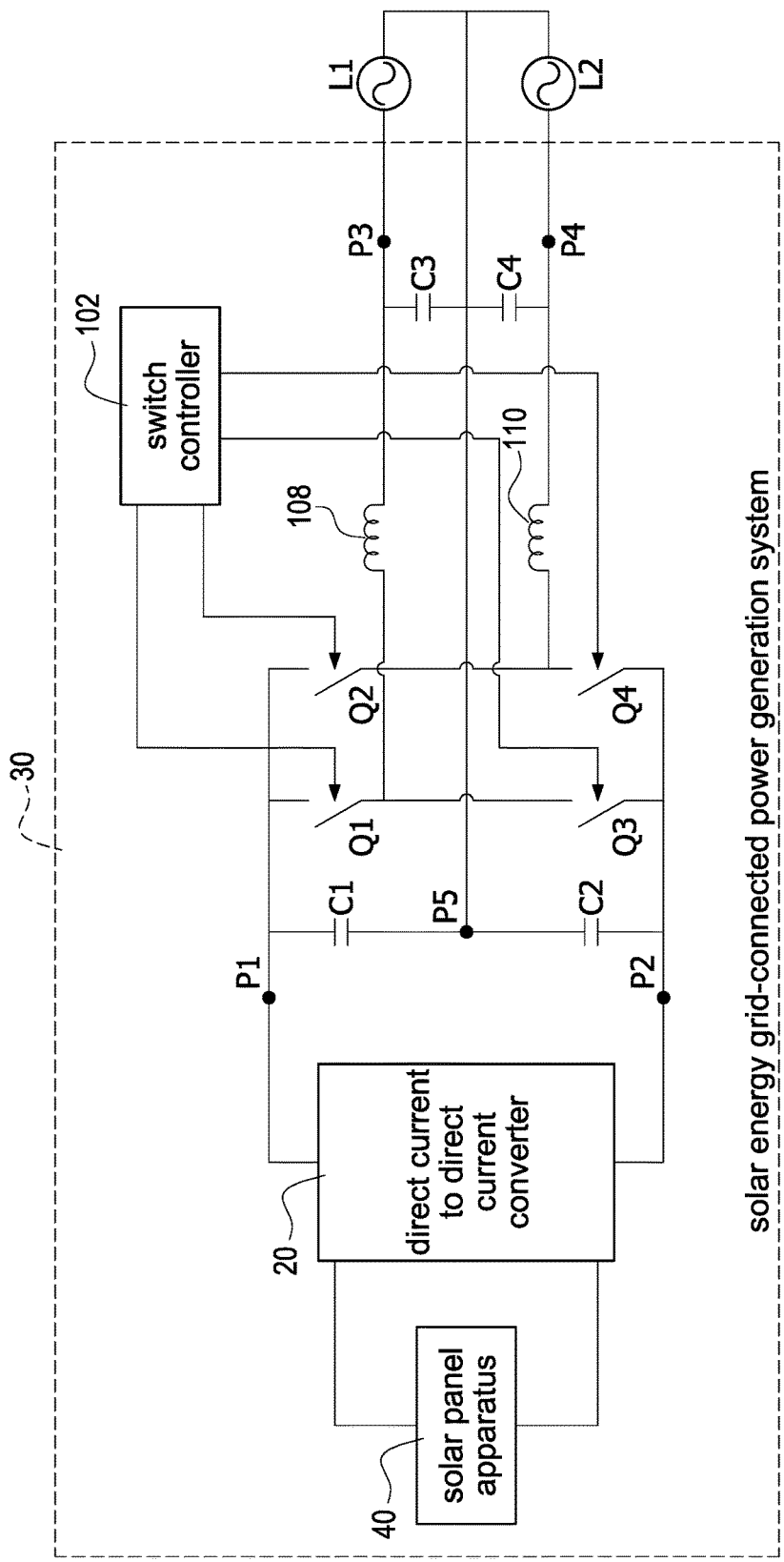
FIG. 5 shows a block diagram of the first embodiment of the solar energy grid-connected power generation system of the present invention.

FIG. 5 shows a block diagram of the first embodiment of the solar energy grid-connected power generation system of the present invention. A solar energy grid-connected power generation system 30 is applied to a first power grid L1 and a second power grid L2. The solar energy grid-connected power generation system 30 comprises a solar panel apparatus 40, a direct current to direct current converter 20, a first point P1, a second point P2, a first output point P3, a second output point P4, a third output point P5, a first capacitor C1, a second capacitor C2, a first switch Q1, a second switch Q2, a third switch Q3, a fourth switch Q4, a first inductor 108, a second inductor 110, a switch controller 102, a third capacitor C3 and a fourth capacitor C4.

The direct current to direct current converter 20 is electrically connected to the solar panel apparatus 40. The first point P1 is connected to the direct current to direct current converter 20. The second point P2 is connected to the direct current to direct current converter 20. The first output point P3 is connected to one side of the first power grid L1. The second output point P4 is connected to one side of the second power grid L2. The third output point P5 is connected between the other side of the first power grid L1 and the other side of the second power grid L2. The first capacitor C1 is connected between the first point P1 and the third output point P5. The second capacitor C2 is connected between the second point P2 and the third output point P5. A first side of the first switch Q1 is connected to the first point P1. A first side of the second switch Q2 is connected to the first point P1. A first side of the third switch Q3 is connected to a second side of the first switch Q1. A second side of the third switch Q3 is connected to the second point P2. A first side of the fourth switch Q4 is connected to a second side of the second switch Q2. A second side of the fourth switch Q4 is connected to the second point P2. One side of the first inductor 108 is connected to the second side of the first switch Q1 and the first side of the third switch Q3. The other side of the first inductor 108 is connected to the first output point P3. One side of the second inductor 110 is connected to the second side of the second switch Q2 and the first side of the fourth switch Q4. The other side of the second inductor 110 is connected to the second output point P4. The switch controller 102 is connected to a third side of the first switch Q1, a third side of the second switch Q2, a third side of the third switch Q3 and a third side of the fourth switch Q4. The third capacitor C3 is connected between the first output point P3 and the third output point P5. The fourth capacitor C4 is connected between the third output point P5 and the second output point P4.

The first capacitor C1, the second capacitor C2, the first switch Q1, the third switch Q3 and the first inductor 108 form and have functions of a half bridge inverter to output the first voltage, and the first capacitor C1, the second capacitor C2, the second switch Q2, the fourth switch Q4 and the second inductor 110 form and have functions of a half bridge inverter to output the second voltage. Therefore, a voltage difference between the first output point P3 and the second output point P4 is equal to a voltage provided by the first power grid L1 added by a voltage provided by the second power grid L2. A voltage difference between the first output point P3 and the third output point P5 is equal to the voltage provided by the first power grid L1. A voltage difference between the third output point P5 and the second output point P4 is equal to a voltage provided by the second power grid L2.

Moreover, the switch controller 102 turns on or turns off the first switch Q1, the second switch Q2, the third switch Q3 and the fourth switch Q4, so that the first capacitor C1, the second capacitor C2, the first switch Q1, the third switch Q3 and the first inductor 108 form and have functions of a half bridge inverter to output the first voltage, and the first capacitor C1, the second capacitor C2, the second switch Q2, the fourth switch Q4 and the second inductor 110 form and have functions of a half bridge inverter to output the second voltage. The description for the elements shown in FIG. 5, which are similar to those shown in figures mentioned above, is not repeated here for brevity.

Figure 6:
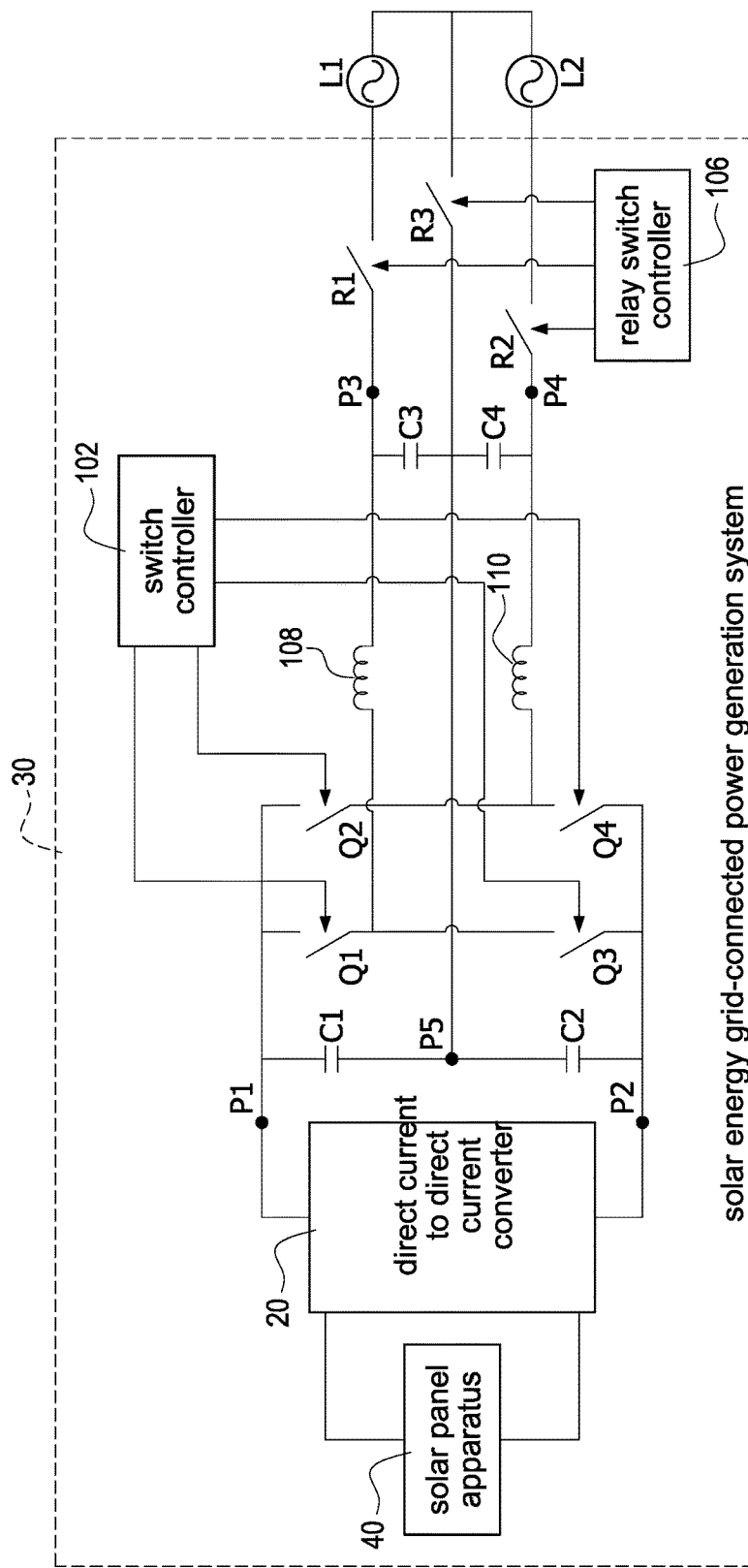
FIG. 6 shows a block diagram of the second embodiment of the solar energy grid-connected power generation system of the present invention.

FIG. 6 shows a block diagram of the second embodiment of the solar energy grid-connected power generation system of the present invention. The description for the elements shown in FIG. 6, which are similar to those shown in the figures mentioned above, is not repeated here for brevity. Moreover, the solar energy grid-connected power generation system 30 further comprises a first relay switch R1, a second relay switch R2, a third relay switch R3 and a relay switch controller 106. The first relay switch R1 is connected to the first output point P3 and one side of the first power grid L1. The second relay switch R2 is connected to the second output point P4 and one side of the second power grid L2. The third relay switch R3 is connected to the third output point P5, the other side of the first power grid L1 and the other side of the second power grid L2. The relay switch controller 106 is connected to the first relay switch R, the second relay switch R2 and the third relay switch R3.

When the relay switch controller 106 turns on the first relay switch R1, the second relay switch R2 and the third relay switch R3, the first capacitor C1, the second capacitor C2, the first switch Q1, the third switch Q3 and the first inductor 108 form and have functions of a half bridge inverter to output the first voltage, and the first capacitor C1, the second capacitor C2, the second switch Q2, the fourth switch Q4 and the second inductor 110 form and have functions of a half bridge inverter to output the second voltage. When the relay switch controller 106 turns on the first relay switch R1 and the second relay switch R2 but turns off the third relay switch R3, the first capacitor C1, the second capacitor C2, the first switch Q1, the second switch Q2, the third switch Q3, the fourth switch Q4, the first inductor 108 and the second inductor 110 form and have functions of a full bridge inverter to output the third voltage.

In the figures mentioned above, when the first relay switch R1, the second relay switch R2 and the third relay switch R3 are turned off, the present invention is converted from the grid-connected application into the independent operation (namely, the stand alone mode).

The advantage of the present invention is to obtain two kinds of voltages. Moreover, the present invention can be changed from two half bridge inverters to a full bridge inverter to be applied to a single power grid.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An inverter apparatus applied to a direct current to direct current converter, a first power grid and a second power grid, the inverter apparatus comprising:
    a first output point connected to one side of the first power grid;
    a second output point connected to one side of the second power grid;
    a third output point connected between the other side of the first power grid and the other side of the second power grid;
    a first relay switch connected to the first output point and one side of the first power grid;
    a second relay switch connected to the second output point and one side of the second power grid;
    a third relay switch connected to the third output point, the other side of the first power grid and the other side of the second power grid;
    a first point connected to the direct current to direct current converter;
    a second point connected to the direct current to direct current converter;
    a first capacitor connected between the first point and the third output point;
    a second capacitor connected between the second point and the third output point;
    a first switch, a first side of the first switch connected to the first point;
    a second switch, a first side of the second switch connected to the first point;
    a third switch, a first side of the third switch connected to a second side of the first switch, a second side of the third switch connected to the second point;
    a fourth switch, a first side of the fourth switch connected to a second side of the second switch, a second side of the fourth switch connected to the second point;
    a first inductor, one side of the first inductor connected to the second side of the first switch and the first side of the third switch, the other side of the first inductor connected to the first output point;
    a second inductor, one side of the second inductor connected to the second side of the second switch and the first side of the fourth switch, the other side of the second inductor connected to the second output point; and
    a switch controller turning on or turning off the first switch, the second switch, the third switch and the fourth switch,
    wherein
        a voltage difference between the first output point and the third output point is equal to a voltage provided by the first power grid; a voltage difference between the third output point and the second output point is equal to a voltage provided by the second power grid; a voltage difference between the first output point and the second output point is equal to the voltage provided by the first power grid added by the voltage provided by the second power grid, and the switch controller turns on or turns off the first switch, the second switch, the third switch and the fourth switch, so that the first capacitor, the second capacitor, the first switch, the third switch and the first inductor form a half bridge inverter to output a first voltage, and the first capacitor, the second capacitor, the second switch, the fourth switch and the second inductor form a half bridge inverter to output a second voltage.

2. The inverter apparatus in claim 1, further comprising:
a third capacitor connected between the first output point and the third output point; and
a fourth capacitor connected between the third output point and the second output point.

3. The inverter apparatus in claim 1, further comprising:
a relay switch controller connected to the first relay switch, the second relay switch and the third relay switch,
wherein when the relay switch controller turns on the first relay switch, the second relay switch and the third relay switch, the first capacitor, the second capacitor, the first switch, the third switch and the first inductor form a half bridge inverter to output the first voltage, and the first capacitor, the second capacitor, the second switch, the fourth switch and the second inductor form a half bridge inverter to output the second voltage; when the relay switch controller turns on the first relay switch and the second relay switch but turns off the third relay switch, the first capacitor, the second capacitor, the first switch, the second switch, the third switch, the fourth switch, the first inductor and the second inductor form a full bridge inverter to output a third voltage.

4. The inverter apparatus in claim 1, further comprising a load switch unit electrically connected to the first output point, the second output point and the third output point, and used to turn on or turn off an external load.

5. A solar energy grid-connected power generation system applied to a first power grid and a second power grid, the solar energy grid-connected power generation system comprising:
a solar panel apparatus;
a direct current to direct current converter electrically connected to the solar panel apparatus;
a first output point connected to one side of the first power grid;
a second output point connected to one side of the second power grid;
a third output point connected between the other side of the first power grid and the other side of the second power grid;
a first relay switch connected to the first output point and one side of the first power grid;
a second relay switch connected to the second output point and one side of the second power grid;
a third relay switch connected to the third output point, the other side of the first power grid and the other side of the second power grid;
a first point connected to the direct current to direct current converter;
a second point connected to the direct current to direct current converter;
a first capacitor connected between the first point and the third output point;
a second capacitor connected between the second point and the third output point;
a first switch, a first side of the first switch connected to the first point;
a second switch, a first side of the second switch connected to the first point;
a third switch, a first side of the third switch connected to a second side of the first switch, a second side of the third switch connected to the second point;
a fourth switch, a first side of the fourth switch connected to a second side of the second switch, a second side of the fourth switch connected to the second point;
a first inductor, one side of the first inductor connected to the second side of the first switch and the first side of the third switch, the other side of the first inductor connected to the first output point; and
a second inductor, one side of the second inductor connected to the second side of the second switch and the first side of the fourth switch, the other side of the second inductor connected to the second output point,
wherein
a voltage difference between the first output point and the third output point is equal to a voltage provided by the first power grid; a voltage difference between the third output point and the second output point is equal to a voltage provided by the second power grid; a voltage difference between the first output point and the second output point is equal to the voltage provided by the first power grid added by the voltage provided by the second power grid, and
the switch controller turns on or turns off the first switch, the second switch, the third switch and the fourth switch, so that the first capacitor, the second capacitor, the first switch, the third switch and the first inductor form a half bridge inverter to output a first voltage, and the first capacitor, the second capacitor, the second switch, the fourth switch and the second inductor form a half bridge inverter to output a second voltage.

6. The solar energy grid-connected power generation system in claim 5, further comprising:
a third capacitor connected between the first output point and the third output point; and
a fourth capacitor connected between the third output point and the second output point.

7. The solar energy grid-connected power generation system in claim 5, further comprising:
a relay switch controller connected to the first relay switch, the second relay switch and the third relay switch,
wherein when the relay switch controller turns on the first relay switch, the second relay switch and the third relay switch, the first capacitor, the second capacitor, the first switch, the third switch and the first inductor form a half bridge inverter to output the first voltage, and the first capacitor, the second capacitor, the second switch, the fourth switch and the second inductor form a half bridge inverter to output the second voltage; when the relay switch controller turns on the first relay switch and the second relay switch but turns off the third relay switch, the first capacitor, the second capacitor, the first switch, the second switch, the third switch, the fourth switch, the first inductor and the second inductor form a full bridge inverter to output a third voltage.

8. An inverter apparatus applied to a direct current to direct current converter and a power grid, the inverter apparatus comprising:
a first relay switch connected to one side of the power grid;

a second relay switch connected to the other side of the power grid;
a third relay switch connected to the other side of the power grid and the second relay switch;
a first output point connected to the first relay switch;
a second output point connected to the second relay switch;
a third output point connected to the third relay switch;
a first point connected to the direct current to direct current converter;
a second point connected to the direct current to direct current converter;
a first capacitor connected between the first point and the third output point;
a second capacitor connected between the second point and the third output point;
a first switch, a first side of the first switch connected to the first point;
a second switch, a first side of the second switch connected to the first point;
a third switch, a first side of the third switch connected to a second side of the first switch, a second side of the third switch connected to the second point;
a fourth switch, a first side of the fourth switch connected to a second side of the second switch, a second side of the fourth switch connected to the second point;
a first inductor, one side of the first inductor connected to the second side of the first switch and the first side of the third switch, the other side of the first inductor connected to the first output point;
a second inductor, one side of the second inductor connected to the second side of the second switch and the first side of the fourth switch, the other side of the second inductor connected to the second output point; and
a switch controller turning on or turning off the first switch, the second switch, the third switch and the fourth switch,
wherein
the first relay switch and the second relay switch are turned on; the third relay switch is turned off; a voltage difference between the first output point and the third output point is equal to a voltage provided by the power grid, and
the switch controller turns on or turns off the first switch, the second switch, the third switch and the fourth switch, so that the first capacitor, the second capacitor, the first switch, the third switch and the first inductor form a half bridge inverter to output a first voltage, and the first capacitor, the second capacitor, the second switch, the fourth switch and the second inductor form a half bridge inverter to output a second voltage.

9. The inverter apparatus in claim 8, further comprising:
a third capacitor connected between the first output point and the third output point; and
a fourth capacitor connected between the third output point and the second output point.

10. The inverter apparatus in claim 8, further comprising:
a relay switch controller connected to the first relay switch, the second relay switch and the third relay switch.

* * * * *